(12) United States Patent
Jwo

(10) Patent No.: US 7,367,499 B2
(45) Date of Patent: May 6, 2008

(54) SCANNER WITH VERTICAL PLATE FORCE DETECTION AND COMPENSATION

(75) Inventor: Chin-Hung Jwo, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 240 days.

(21) Appl. No.: 11/019,834

(22) Filed: Dec. 21, 2004

(65) Prior Publication Data

US 2006/0131416 A1 Jun. 22, 2006

(51) Int. Cl.
*G06K 15/00* (2006.01)

(52) U.S. Cl. .................. 235/383; 235/462.14; 177/245

(58) Field of Classification Search ............ 235/462.14, 235/383; 177/245
See application file for complete search history.

(56) References Cited

U.S. PATENT DOCUMENTS

| | | | |
|---|---|---|---|
| 4,656,344 A * | 4/1987 | Mergenthaler et al. .. | 177/25.15 |
| 4,660,663 A | 4/1987 | Amacher | |
| 4,715,457 A | 12/1987 | Amacher | |
| 4,909,338 A | 3/1990 | Vitunic | |
| 5,086,879 A | 2/1992 | Latimer | |
| 5,143,164 A | 9/1992 | Nahar | |
| 5,410,108 A | 4/1995 | Williams | |
| 5,459,308 A * | 10/1995 | Detwiler et al. ....... | 235/462.35 |
| 5,684,289 A * | 11/1997 | Detwiler et al. ....... | 235/462.35 |
| 5,705,802 A * | 1/1998 | Bobba et al. .......... | 235/462.39 |
| 5,767,454 A | 6/1998 | Goodwin, III | |
| 5,773,767 A | 6/1998 | Collins, Jr. | |
| 5,834,708 A | 11/1998 | Svetal | |
| 5,936,218 A * | 8/1999 | Ohkawa et al. ........ | 235/462.01 |
| 6,080,938 A | 6/2000 | Lutz | |
| 6,085,979 A * | 7/2000 | Maddox ................. | 235/462.13 |
| 6,155,489 A * | 12/2000 | Collins et al. ......... | 235/462.01 |
| 6,237,852 B1 | 5/2001 | Svetal | |
| 6,488,207 B1 | 12/2002 | Kawai | |
| 6,827,266 B2 * | 12/2004 | Mergenthaler et al. | 235/462.14 |
| 6,830,186 B1 * | 12/2004 | Nahar .................... | 235/462.14 |

\* cited by examiner

*Primary Examiner*—Uyen-Chau N Le
(74) *Attorney, Agent, or Firm*—Fay Kaplun & Marcin, LLP

(57) ABSTRACT

Described is a multi-optic scanner that can detect and/or measure weight placed on its vertical plate. In one embodiment, a portion of the vertical plate is positioned under a portion of a horizontal plate so that a force exerted on the vertical plate is transferred, whole or in part, to the horizontal plate. In alternate embodiments, one or more sensors are coupled to the vertical plate for detecting a force on the plate. The sensors can be coupled to an alert, such as an audible signal, to warn an operator of a misread weight.

21 Claims, 4 Drawing Sheets

SCANNER WITH VERTICAL PLATE FORCE DETECTION AND COMPENSATION

FIELD OF THE INVENTION

The invention is directed to data capture devices and, more particularly to scanners that can detect and/or measure weight placed on its vertical plate.

BACKGROUND OF THE INVENTION

Dataforms can be any indicia that encode numeric and other information in visual form. Additionally, any object, image, etc that data can be extracted from can also be a dataform. Data capture devices that can decode dataforms have become very common. One type of data capture device is a fixed scanner. These fixed scanners can comprise multiple scanners, such as, for example a horizontal scanner and a vertical scanner. The scanners are positioned perpendicular to each other and provide an operator with multiple scanning angles. Each scanner is covered by a plate for protection, and to provide a level surface. The plates have a window region to allow the scanners to read dataforms.

In some embodiments of known multi-optic scanners, the horizontal portion of the scanner comprises a scale for measuring the weight of objects placed on the scanner. Supermarkets that sell items by their weight, such as, produce, use these types of scanners for faster checkouts and space conservation. Unfortunately, when an item leans on the vertical portion of the scanner, the scale may not measure the full weight of the item since some of the weight is transferred to the vertical portion of the scanner. Some known scanners solve this problem by using a single rigid plate that bends to cover both the horizontal and the vertical scanners. The plate has a horizontal plane and a vertical plane, and both planes comprise a transparent potion to allow the scanners to read dataforms.

Although the single rigid platter solves the problem of objects leaning on the vertical portion of the multi-optic scanner, the singular nature of the platter raises other issues. For example, a single plate limits the amount of modification that can be done to the scanner, and if there is a problem with either the vertical or horizontal portions of the plate, the entire plate has to be replaced. Accordingly, there is a need for a multi-optic scanner that addresses these issues while measuring and/or detecting a force on its vertical portion.

SUMMARY OF THE INVENTION

The invention as described and claimed herein satisfies this and other needs, which will be apparent from the teachings herein. An embodiment of the invention includes scales and scanners that can detect and/or measure weight placed on its vertical plate.

An embodiment of a multi-optic scanner implemented in accordance with the invention comprises a scan module, a horizontal plate coupled to a load cell and a vertical plate coupled to the load cell. The horizontal plate comprises a first extending member that is positioned over a second extending member extending from the vertical plate. The plates are positioned so that at least some force applied to the vertical plate can be transferred to the horizontal plate while the remaining force can go directly to the load cell through the undercarriage.

In some embodiments, the multi-optic scanner can further comprise an undercarriage mounted on top of the load cell and supporting the horizontal and vertical plates. The plates are coupled to the undercarriage by at least one support point and at least one of the support points can be a hinge.

An alternate embodiment of the multi-optic scanner comprises a scan module, a scale module comprising a horizontal plate coupled to a load cell, a vertical plate, a sensor coupled to said vertical plate for detecting a force on said vertical plate and an alert for warning a multi-optic scanner operator. The alert can be a light emitting diode (LED), an audible warning, or a message written on a screen. The alert informs the operator that an erroneous weight measurement may have occurred and the operator should adjust the item and weigh it again.

Other objects and features of the invention will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

DETAILED DESCRIPTION OF EXEMPLARY EMBODIMENTS

There will now be shown and described in connection with the attached drawing figures several exemplary embodiments of a multi-optic scanner.

As mentioned above, a multi-optic scanner may not properly measure the weight of an object that leans against its vertical plate. One embodiment of the invention comprises a multiple weight-platter system that transfers force from the vertical plate to a horizontal plate so that the complete weight of the object is measured. The multiple weight-platter system is adjustable to meet different customer needs. For example, the rigid vertical plate can be replaced with a lighter less rigid material or removed for customers that do not want or need adjustments for weight on the vertical plate. In some scanners, no vertical plate is used since the vertical scan module is already sealed for dust protection.

Additionally in an alternate embodiment of the invention, sensors can be coupled to the vertical plate to detect a force on the vertical plate. The sensors are also coupled to alerts, such as for example, an LED, a speaker and/or a computer, that warn a scanner operator that an object is leaning against the vertical plate and should be reweighed. The operator can then adjust the object to obtain its weight.

Figure 1:
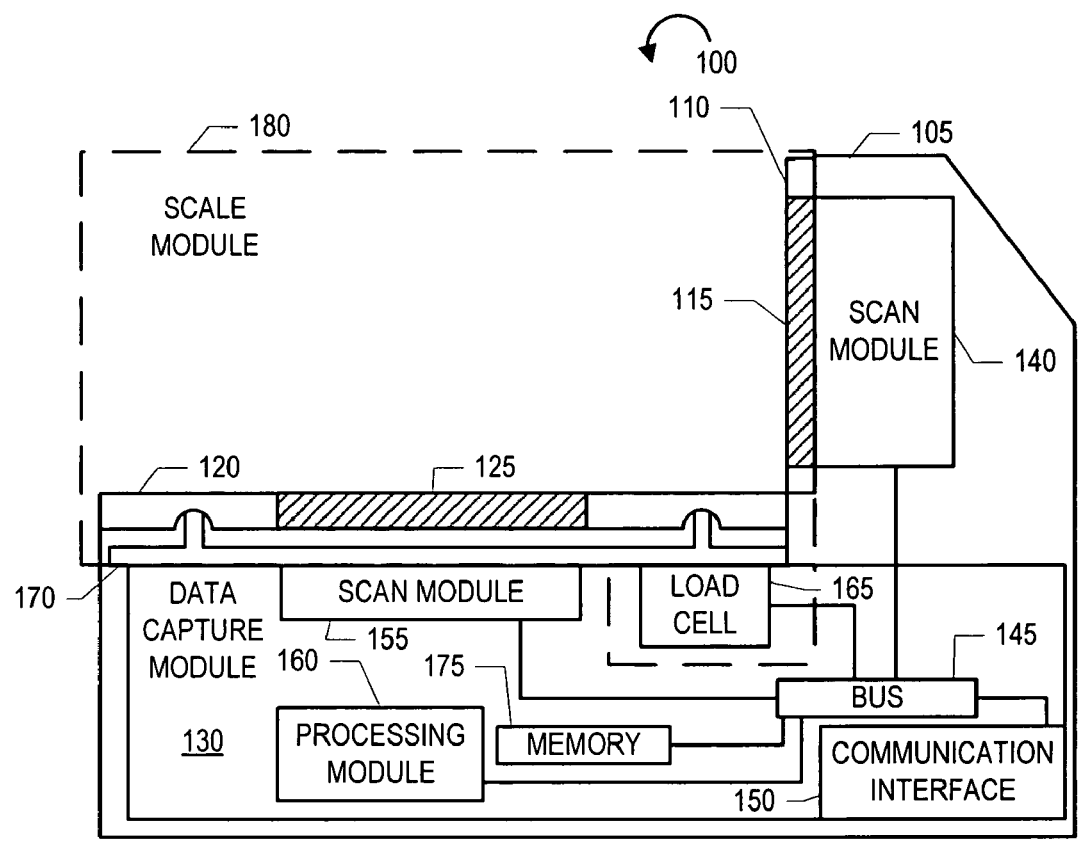
FIG. 1 illustrates an exemplary multi-optic scanner implemented according to an embodiment of the invention.

FIG. 1 illustrates an exemplary multi-optic scanner 100 implemented in accordance with the invention. The scanner 100 can be part of a checkout counter at a store. The scanner 100 comprises a scanner housing 105, a scale module 180, a data capture module 130 and scan module 140. Scale module 180 comprises a vertical plate 110, a horizontal plate 120, an undercarriage 170 and a load cell 165.

The housing 105 has an "L" shape having a horizontal portion and a vertical portion. The undercarriage 170 is positioned on top of the horizontal portion of the housing 105 and is coupled to load cell 165. Horizontal plate 120 is positioned on top of the undercarriage 170, creating a platform to place objects. The weight of objects placed on the horizontal plate 120 is transferred to the load cell 165 through the undercarriage 170. Exemplary load cell 165 is sensitive to deformations and generates a measurable electrical signal based on the amount of deformation. The electrical signal can be analyzed to determine the weight of the object.

The scanner 100 can have, in an embodiment of the invention, an undercarriage 170 that has a rectangular horseshoe configuration when viewed from the top. The load cell 165 is positioned under the middle section of the undercarriage 170 that is opposite the open side. In other embodiments, the undercarriage 170. In this configuration, the scanner 100 can comprise more than one load cell 165. When there are two load cells 165, each cell can be positioned under opposite sides of the undercarriage 170.

The horizontal plate 120 is made of a rigid material and comprises a transparent region or exit window 125. The exit window 125 allows the data capture module 130 to scan objects, for example, objects comprising dataforms. The vertical plate 110 also comprises an exit window 115 for scan module 140. The vertical plate 110 may be made of a rigid material or a less rigid material than the horizontal plate 120 depending on the embodiment of the invention. Although the vertical plate 110 and the horizontal plate 120 are depicted as being perpendicular, in alternate embodiments the plates 110, 120 can be greater or less than 90° in separation.

Data capture module 130 comprises processing module 160, scan module 155, memory 175 and communication interface 150 coupled together by bus 145. Scan module 140 is coupled to data capture module 130 via bus 145. The modules and other components of data capture module 130 can be implemented as any combination of software, hardware, hardware-emulating software, and reprogrammable hardware. Additionally, although FIG. 1 depicts data capture module 130 in the horizontal portion of the housing 105, all or some of the modules and components of data capture module 130 may be located in the vertical portion of the housing 105 or in an external location. The bus 145 is an exemplary bus showing the interoperability of the different modules of the invention. As a matter of design choice there may be more than one bus and in some embodiments certain modules may be directly coupled instead of coupled to a bus 145.

Processing unit 160 can be implemented as, in exemplary embodiments, one or more Central Processing Units (CPU), Field-Programmable Gate Arrays (FPGA), etc. In an embodiment, the processing unit 160 can comprise a general purpose CPU that processes software and data stored in memory 175. In other embodiments, modules of the processing unit 160 may be preprogrammed in the processing unit's 160 memory to perform functions, such as, for example, signal processing, interface emulation, etc. In alternate embodiments, processing can be done in an external computer. Processing unit 160 can comprise any combination of the processors described above. The scan modules 140, 155 can be implemented as, for example, a laser based scanner, an image scanner or any other device for analyzing dataforms.

Memory 175 can be implemented as volatile memory, non-volatile memory and rewriteable memory, such as, for example, Random Access Memory (RAM), Read Only Memory (ROM) and/or flash memory. The memory 120 can store methods and processes used to operate the scanner 100 and can also be used to store raw and/or processed data.

The multi-optic scanner 100 can be implemented as a module for different devices or systems that communicate in a variety of languages. Therefore, data collection module 100 comprises a communication interface 150 for coupling to external devices. The scanner may comprise many different types of interfaces for different peripherals. These devices can comprise a computer, a handheld scanner, etc. The attached devices can, in some embodiments, assist in processing or the attached devices can provide additional functionality. The scanner 100 can also comprise translation methods for interfacing with peripheral devices in different computer languages. Different interfaces include Universal Serial Bus (USB), scanner emulation, IBM keyboard wedge, Symbol Serial Interface (SSI), etc.

The scanner 100 can also include a power management system that manages the power used by the scanner 100. In some embodiments, the scanner 100 can switch to a power save mode, when no activity is detected for a given amount of time. The power save mode can completely shut down the scanner 100 or initiate other power saving techniques.

Figure 2:
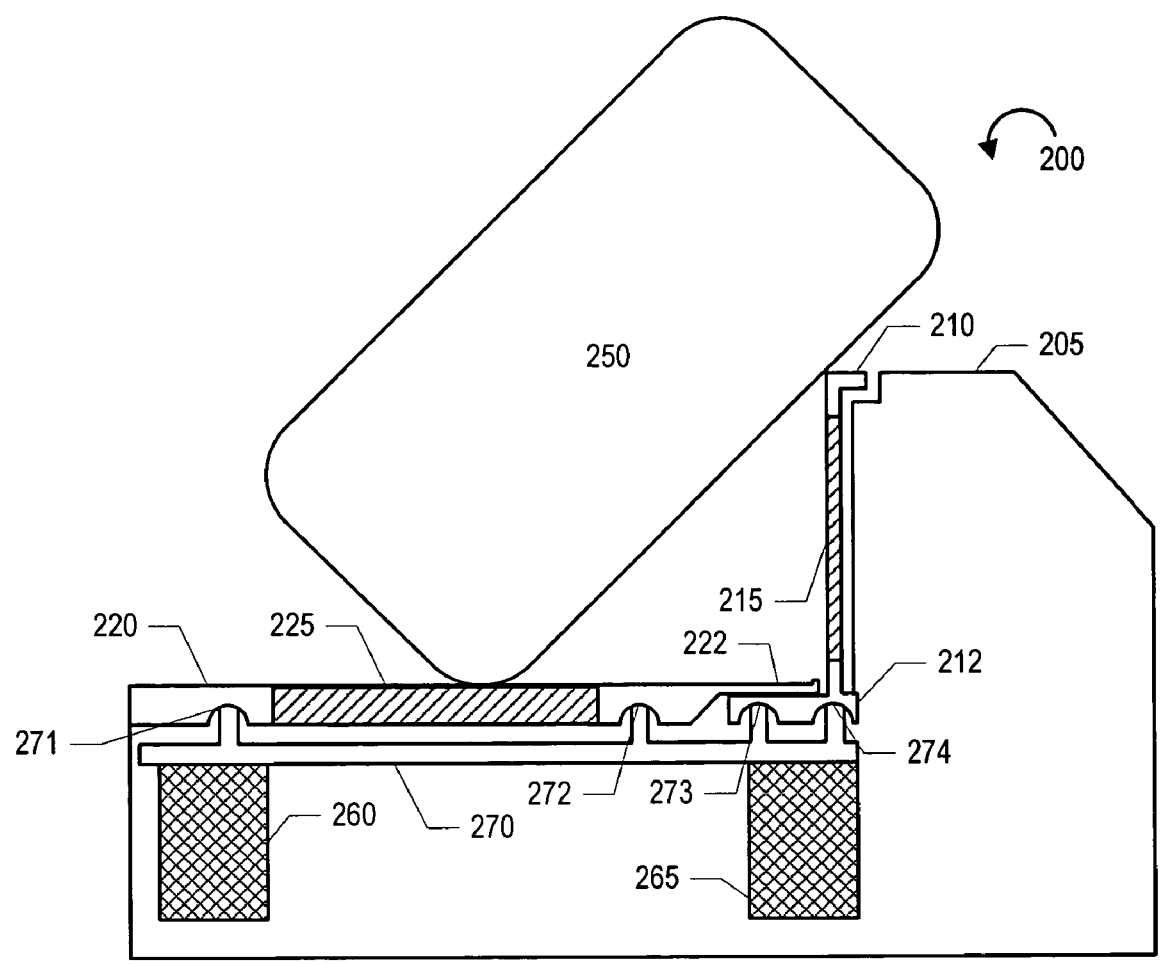
FIG. 2 illustrates an exemplary dual weight platter embodiment of the invention.

FIG. 2 illustrates an exemplary bi-optic scanner 200, comprising a dual weight platter system, implemented in accordance with the invention. Bi-optic scanner 200 comprises a data capture module and a second scan module, which are not shown. In addition, scanner 200 comprises a housing 205, a vertical weight plate 210, a horizontal weight plate 220, an undercarriage 270 and two load cells 260, 265. The load cells are positioned in a horizontal portion of the housing 205, and the undercarriage 270 is position above the load cells 260, 265. In this exemplary embodiment, a top view of the undercarriage 270 looks like a rectangle with a rectangular cut out. The undercarriage also comprises eight support points. FIG. 2 illustrates four support points 271-274, and the other four support points are on the opposite side of the depicted support points (not shown).

The vertical weight plate of scanner 200 comprises an exit window 215, a horizontal extending member 212 and four support elements for coupling with support points 273, 274 and their opposite support points (not shown). In an embodiment of the invention, support point 274, and its opposite support point, can be coupled to the vertical weight plate 210 as a hinge. The horizontal extending member 212 is a member that extends in a horizontal direction from the bottom on the vertical plate 210. The horizontal weight plate 220 comprises an exit window 225, a horizontal extending member 222 and four support elements for coupling with support points 271, 272 and their opposite support points (not shown). The extending member 222 of the horizontal plate 220 is an extension of the horizontal weight plate 220 and is sufficiently long enough to be positioned over the extending member 212 of vertical plate 210. The height of the extending member 220 is less than the height of the horizontal weight plate 220, so that when the extending member 222 of the horizontal plate is positioned over the extending member 212 of the vertical plate, the horizontal plate provides a flat platform for weighing objects. In some embodiments the extending members may comprise nubs and/or grooves or other coupling elements so that the plates are coupled securely. Additionally, the vertical weight plate 210 comprises a horizontal extension on the top of the plate 210, for when long objects lean on the top corner of the plate 210.

The dual weight platter system of bi-optic scanner 200 can measure the weight of items that lean on the vertical weight platter 210. When an item 250 leans on the scanner 200, a downward force is applied to the horizontal weight plate and is measured by the load cell. Additionally, the leaning item 250 creates a downward load and a sideward load on the vertical plate 210. The downward load on the vertical plate 210 is transferred to the undercarriage 270 through the support points 273, 274 and is measured by the load cells. The sideward load on the vertical plate 210 creates a moment at support point 274, which is transferred through the moment arm to the horizontal plate 220 an then measured by the load cells 260, 265. The vertical plate and the horizontal plate are made of a material rigid enough to transfer the load. Thus, the scanner 200 measures the entire weight of the item 250.

Some businesses may want a bi-optic scanner but not the dual weight platter system. The dual nature of the weight platter system of the invention allows the scanner to be configurable to these situations. For example, the rigid vertical weight plate can be an option. In place of a dual weight platter systems, in an alternate embodiment of the invention, the multi-optic scanner may comprise sensors for detecting a load on the vertical plate. The sensors are coupled to an alert, such as for example an LED or a speaker, which can warn a scanner operator that the measured weight may be wrong, the item should be reweighed.

Figure 3:
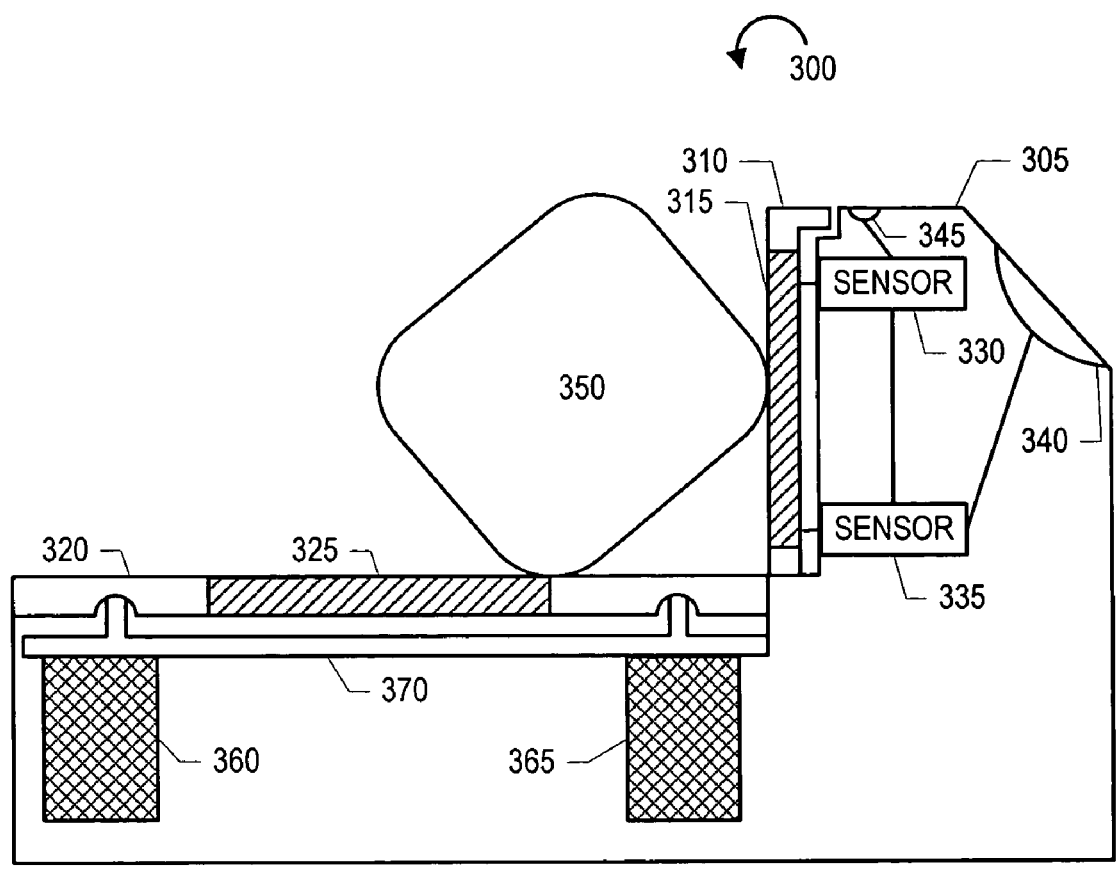
FIG. 3 illustrates an exemplary vertical plate sensor embodiment of the invention.

FIG. 3 illustrates an exemplary bi-optic scanner 300 comprising a sensor system for detecting a force on a vertical plate. In addition to the components described in FIG. 1, exemplary bi-optic scanner 300 comprises a housing 305, a vertical plate 310 and a horizontal plate 320. The horizontal plate 320 is made of a rigid material and serves as a weight platter. The plate 320 also comprises a transparent region 325, through which a scanner can read dataforms. The horizontal plate 320 is positioned above an undercarriage 370 by four support points, and the undercarriage 370 is positioned above two load cells 360, 365. When an object is placed on the horizontal plate 320, its weight is transferred through the plate and the undercarriage to the load cells 360, 365.

The vertical plate 310 may or may not be made of a rigid material, and comprises a transparent region 315, for scanning. Additionally, the weight plate 310 comprises a horizontal extension on the top of the plate 310, for when long objects lean on the top corner of the plate 310. The vertical plate 310 is also coupled to force or displacement sensors 330, 335. The sensors are coupled to alerting devices, such as, for example, a light emitting diode (LED) 345 and/or a speaker or other audible device 340. The alerting devices are activated when an object 350 is leans on the vertical plate 310. The alerting devices 340, 345 can be directly coupled to the sensors 330, 335 or the alerting devices 340, 345 can be coupled to the sensors 330, 335 through the processing module 160. Additionally, the scanner 300 can be coupled to devices, such as, for example, a cash register and/or some other computer. The cash register can be programmed to invalid weighing results when the sensors 330, 335 are activated. The cash register can also display a warning message to the operator to adjust the object 350 and reweigh it.

Figure 4:
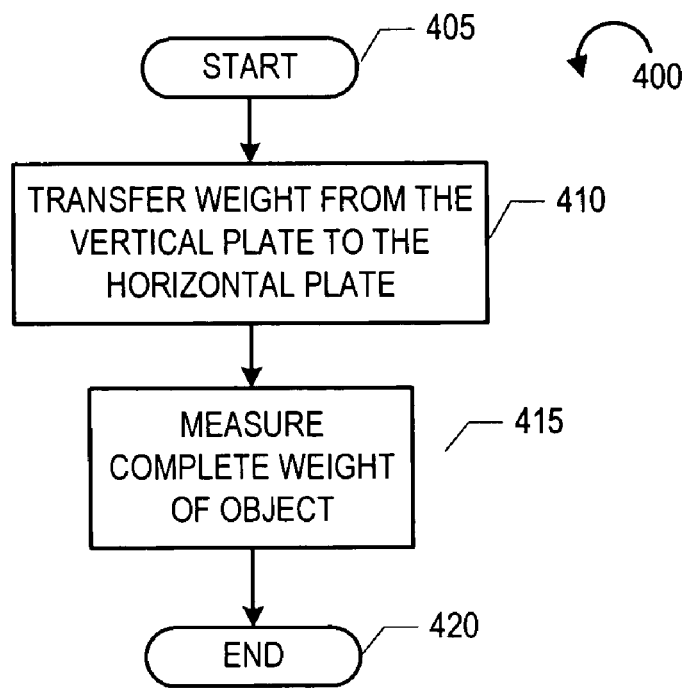
FIG. 4 illustrates an exemplary multiple weight platter method implemented according to an embodiment of the invention.

FIG. 4 illustrates an exemplary embodiment of a method 400 for measuring the weight of an object that is leaning on a vertical plate of a multi-optic scanner. Reference to scanner 200 is made in the description of method 400. The steps of method 400 and other methods described herein are exemplary and the order of the steps may be rearranged as a matter of design choice. Method 400 begins with start step 405. In an exemplary embodiment, the method 400 begins when an object 250 is leaning on the vertical plate 210 of the scanner 200.

Processing proceeds from step 405 to step 410, where the sideward force exerted by the object 250 on the vertical plate 210 is mechanically transferred to the horizontal plate 220, and thus to the load cells 260, 265, through a moment arm created on the extending member 212. The downward force exerted by the object 250 on the horizontal plate 220 and the vertical plate 210, are also passed to the load cells. Therefore, in step 415, the load cells 260, 265, measures the complete weight of the object 250. The method 400 ends in step 420, and the scanner 200 is ready to receive another object for scanning and/or measuring.

Figure 5:
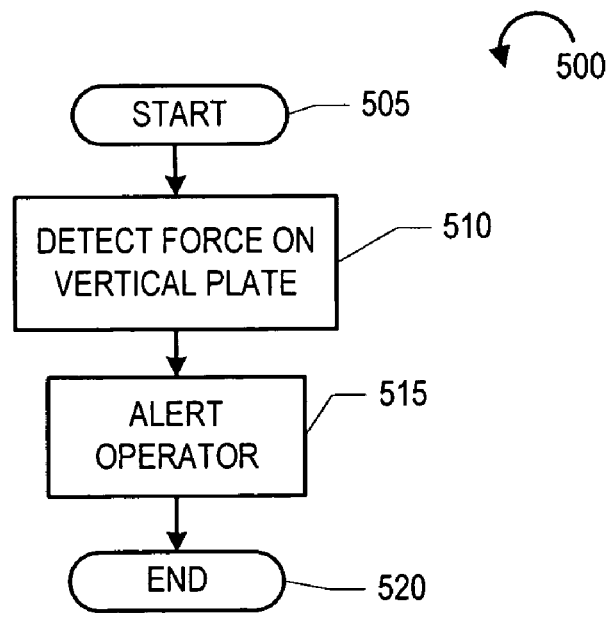
FIG. 5 illustrates an exemplary vertical plate force detection method implemented according to an embodiment of the invention.

FIG. 5 illustrates an exemplary embodiment of a method 500 for detecting an object that is leaning on a vertical plate of a multi-optic scanner. Reference to scanner 300 is made in the description of method 500. The steps of method 500 and other methods described herein are exemplary and the order of the steps may be rearranged as a matter of design choice. Method 500 begins with start step 505. In an exemplary embodiment, the method 500 begins when an object 350 is leaning on the vertical plate 310 of the scanner 300.

Processing proceeds from step 505 to step 510, where a force is detected on the vertical plate 310 by sensors 330, 335. In an embodiment, the sensors 330, 335 are directly coupled to alerts, such as for example LED 345 and speaker 340. Thus, after a force is detected in step 510, processing proceeds to step 515, where the operator of the scanner is alerted to the leaning object 350. The LED 345 can be red in color and/or can flash. Additionally, the speaker 340 can emit a beeping noise or instruct the operator to reweigh the object.

In alternate embodiments the sensors 330, 335 are coupled to a processing module. The processing module can output a warning signal to a coupled device through communication interface 150. The coupled device can be programmed to alert the operator, in step 515, by invaliding the last weight measurement and/or telling the operator to reweigh the item. After the operator is warned, the method 500 ends in step 520, and the scanner 300 is ready to reweigh the object.

While there have been shown and described and pointed out fundamental novel features of the invention as applied to preferred embodiments thereof, it will be understood that various omissions and substitutions and changes in the form and detail of the disclosed invention may be made by those skilled in the art without departing from the spirit of the invention. It is the intention, therefore, to be limited only as indicated by the scope of the claims appended hereto.

What is claimed:
1. A scale comprising:
  a horizontal plate coupled to a load cell, said horizontal plate comprising a first extending member;
  a vertical plate coupled to said load cell, said vertical plate comprising a second extending member, wherein said second extending member is positioned under said first extending member, and at least some force can transfer from said vertical plate to said horizontal plate; and
  a sensor detecting if said vertical plate touches one of a scan module and a housing.

2. The scale of claim 1, further comprising an undercarriage mounted on top of said load cell and wherein said undercarriage supports said horizontal plate and said vertical plate.

3. A scanner comprising:
a scan module;
a horizontal plate coupled to a load cell, said horizontal plate comprising a first extending member;
a vertical plate coupled to said load cell, said vertical plate comprising a second extending member, wherein said second extending member is positioned under said first extending member, and at least some force can transfer from said vertical plate to said horizontal plate; and
a sensor detecting if said vertical plate touches one of a scan module and a housing.

4. The scanner of claim 3, wherein said horizontal plate and said vertical plate further comprise transparent regions.

5. The scanner of claim 3, further comprising at least one additional load cell distributed under said horizontal plate.

6. The scanner of claim 3, further comprising at least one additional scan module.

7. The scanner of claim 3, wherein said at least some force is mechanically transferred from said vertical plate to said horizontal plate.

8. The scanner of claim 3, wherein said horizontal plate and said vertical plate are rigid enough to transfer forces exerted on said plates to said load cell.

9. The scanner of claim 3, wherein said horizontal plate and said vertical plate are interlocking.

10. The scanner of claim 3, further comprising an undercarriage mounted on top of said load cell and wherein said undercarriage supports said horizontal plate and said vertical plate.

11. The scanner of claim 10, wherein said horizontal plate and said vertical plate are coupled to said undercarriage by at least one support point.

12. The scanner of claim 10, wherein said vertical plate is coupled to said undercarriage in a hinged configuration.

13. A method of measuring a force on a scanner comprising:
providing a horizontal plate coupled to a load cell, said horizontal plate comprising a first extending member;
transferring at least some force from a vertical plate to said horizontal plate, wherein said vertical plate is coupled to said load cell and said vertical plate comprises a second extending member, wherein said second extending member is positioned under said first extending member; and
detecting if said vertical plate touches one of a scan module and a housing.

14. The method of claim 13, wherein said horizontal plate and said vertical plate further comprise transparent sections.

15. The method of claim 13, wherein said horizontal plate is coupled to at least one additional load cell distributed under said plate.

16. The method of claim 13, wherein said at least some force is mechanically transferred from said vertical plate to said horizontal plate.

17. The method of claim 13, wherein said horizontal plate and said vertical plate are rigid enough to transfer forces exerted on said plates to said load cell.

18. The method of claim 13, wherein said horizontal plate and said vertical plate are interlocking.

19. The method of claim 13, wherein said scanner further comprises an undercarriage mounted on top of said load cell and wherein said undercarriage supports said horizontal plate and said vertical plate.

20. The method of claim 19, wherein said horizontal plate and said vertical plate are coupled to said undercarriage by at least one support point.

21. The method of claim 19, wherein said vertical plate is coupled to said undercarriage in a hinged configuration.

* * * * *

UNITED STATES PATENT AND TRADEMARK OFFICE
CERTIFICATE OF CORRECTION

PATENT NO.        : 7,367,499 B2  
APPLICATION NO. : 11/019834  
DATED             : May 6, 2008  
INVENTOR(S)       : Jwo

Page 1 of 1

It is certified that error appears in the above-identified patent and that said Letters Patent is hereby corrected as shown below:

ON THE TITLE PAGE

Item (57), under "ABSTRACT", Line 9, delete "misread" and insert -- measured --, therefor.

Signed and Sealed this

Twenty-fourth Day of November, 2009

David J. Kappos  
*Director of the United States Patent and Trademark Office*